United States Patent
Song et al.

(10) Patent No.: US 12,198,029 B2
(45) Date of Patent: Jan. 14, 2025

(54) JOINT TRAINING METHOD AND APPARATUS FOR MODELS, DEVICE AND STORAGE MEDIUM

(71) Applicant: Beijing Baidu Netcom Science and Technology Co., Ltd., Beijing (CN)

(72) Inventors: Chuanyuan Song, Beijing (CN); Zhi Feng, Beijing (CN); Liangliang Lyu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 947 days.

(21) Appl. No.: 17/210,216

(22) Filed: Mar. 23, 2021

(65) Prior Publication Data

US 2021/0209515 A1    Jul. 8, 2021

(30) Foreign Application Priority Data

Sep. 25, 2020   (CN) .......................... 202011025747.4

(51) Int. Cl.
*G06N 20/20*    (2019.01)
*H04L 9/00*    (2022.01)

(52) U.S. Cl.
CPC ............. *G06N 20/20* (2019.01); *H04L 9/008* (2013.01)

(58) Field of Classification Search
CPC ................................ G06N 20/20; H04L 9/008
See application file for complete search history.

(56) References Cited

U.S. PATENT DOCUMENTS

2017/0310643 A1   10/2017 Hardy et al.
2021/0097430 A1*   4/2021 Das ........................ G06N 20/00
(Continued)

FOREIGN PATENT DOCUMENTS

CN       109165725 A    1/2019
CN       109325584 A    2/2019
(Continued)

OTHER PUBLICATIONS

Song, Tianshu, Yongxin Tong, and Shuyue Wei. "Profit allocation for federated learning." 2019 IEEE International Conference on Big Data (Big Data). IEEE, 2019. (Year: 2019).*
(Continued)

*Primary Examiner* — Lut Wong
(74) *Attorney, Agent, or Firm* — Ice Miller LLP; Justin D. Swindells

(57) ABSTRACT

The present disclosure provides a joint training method and apparatus for models, a device and a storage medium. The method may include: training a first-party model to be trained using a first sample quantity of first-party training samples to obtain first-party feature gradient information; acquiring second-party feature gradient information and second sample quantity information from a second party, where the second-party feature gradient information is obtained by training, by the second party, a second-party model to be trained using a second sample quantity of second-party training samples; and determining model joint gradient information according to the first-party feature gradient information, the second-party feature gradient information, first sample quantity information and the second sample quantity information, and updating the first-party model and the second-party model according to the model joint gradient information.

16 Claims, 5 Drawing Sheets

(56) References Cited

U.S. PATENT DOCUMENTS

| | | | |
|---|---|---|---|
| 2021/0150269 A1* | 5/2021 | Choudhury | ........ G06V 30/1985 |
| 2021/0312334 A1 | 10/2021 | Liu et al. | |
| 2023/0325529 A1* | 10/2023 | Sav | ....................... H04L 9/0891 |
| | | | 726/26 |

FOREIGN PATENT DOCUMENTS

| | | |
|---|---|---|
| CN | 109886417 A | 6/2019 |
| CN | 111177768 A | 5/2020 |
| CN | 111428887 A | 7/2020 |
| CN | 111461215 A | 7/2020 |
| CN | 111523686 A | 8/2020 |

OTHER PUBLICATIONS

Song, Lei, et al. "Privacy-preserving unsupervised domain adaptation in federated setting." IEEE Access 8 (2020): 143233-143240. (Year: 2020).*

Roy, Abhijit Guha, et al. "Braintorrent: A peer-to-peer environment for decentralized federated learning." arXiv preprint arXiv: 1905.06731 (2019). (Year: 2019).*

European Patent Office; Extended European Search Report for Application No. 21164246.7, dated Jan. 18, 2022 (43 pages).

Shengwen Yang et al.; "Parallel Distributed Logistic Regression for Vertical Federated Learning Without Third-Party Coordinator"; Arxiv.org, Cornell University Library, 201 Olin Library Cornell University, Ithaca, New York; Nov. 22, 2019; XP081537604 (6 pages).

Song Lei et al.; "Privacy-Preserving Unsupervised Domain Adaptation in Federated Setting"; IEEE Access, IEEE, USA; vol. 8, pp. 143233-143240; Aug. 3, 2020; XP011804655; DOI: 10.1109/ACCESS.2020.3014264 (8 pages).

Yang Qiang Qyang@CSE UST HK et al.; "Federated Machine Learning"; ACM Transactions on Intelligent Systems and Technology; Association for Computing Machinery Corporation, 2 Penn Plaza, Suite 701, New York, New York USA, vol. 10, No. 2, pp. 1-19; Jan. 28, 2019; XP058492066; ISSN: 2157-6904; DOI: 10.1145/3298981 (19 pages).

Chen, G., et al., "Implementation of communication fraud identification model based on federated learning", Telecommun. Sci., 2020, 36(S1), 300-306, English abstract only.

Jiang, J., et al., "Decentralised federated learning with adaptive partial gradient aggregation", CAAI Trans. Intell. Technol., 2020, 5(3):230-236.

Zhou, J., et al., "Survey on Security and Privacy-preserving in Federated Learning", Journal of Xihua University (Natural Science Edition), Jul. 2020, 39(4):9-17, English abstract only.

* cited by examiner

JOINT TRAINING METHOD AND APPARATUS FOR MODELS, DEVICE AND STORAGE MEDIUM

CROSS-REFERENCE TO RELATED APPLICATIONS

This application claims priority to Chinese Patent Application No. 202011025747.4, filed on Sep. 25, 2020, titled "Joint training method and apparatus for models, device and storage medium," which is hereby incorporated by reference in its entirety.

TECHNICAL FIELD

The present disclosure relates to the field of computer technology, particularly to an artificial intelligence technology, and specifically to a joint training method and apparatus for models, a device and a storage medium.

BACKGROUND

In today's society of data expansion, the value contained in mass has become increasingly prominent, and how to effectively mine valid information in the mass data has become an important issue facing various fields. Because the mass data is scattered in various platforms, mass information needs to be integrated together during data mining to train machine models. Among them, the logistic regression model is a powerful machine learning tool that may be used to effectively classify data.

SUMMARY

Embodiments of the present disclosure provide a joint training method and apparatus for models, a device and a storage medium.

According to an aspect, an embodiment of the present disclosure provides a joint training method for models, including: training a first-party model to be trained using a first sample quantity of first-party training samples to obtain first-party feature gradient information; acquiring second-party feature gradient information and second sample quantity information from a second party, wherein the second-party feature gradient information is obtained by training, by the second party, a second-party model to be trained using a second sample quantity of second-party training samples; and determining model joint gradient information according to the first-party feature gradient information, the second-party feature gradient information, first sample quantity information and the second sample quantity information, and updating the first-party model and the second-party model according to the model joint gradient information.

According to another aspect, an embodiment of the present disclosure provides a joint training method for models, including: training a second-party model to be trained using a second sample quantity of second-party training samples to obtain second-party feature gradient information; and sending second sample quantity information and the second-party feature gradient information to a first party for instructing the first party to perform operations comprising: training a first-party model to be trained using a first sample quantity of first-party training samples to obtain first-party feature gradient information; and determining model joint gradient information according to the first-party feature gradient information, the second-party feature gradient information, first sample quantity information and the second sample quantity information, and updating the first-party model and the second-party model according to the model joint gradient information.

According to another aspect, an embodiment of the present disclosure provides a joint training apparatus for models, including: an information determining module, configured to train a first-party model to be trained using a first sample quantity of first-party training samples to obtain first-party feature gradient information; an information acquiring module, configured to acquire second-party feature gradient information and second sample quantity information from a second party, wherein the second-party feature gradient information is obtained by training, by the second party, a second-party model to be trained using a second sample quantity of second-party training samples; and a model updating module, configured to determine model joint gradient information according to the first-party feature gradient information, the second-party feature gradient information, first sample quantity information and the second sample quantity information, and update the first-party model and the second-party model according to the model joint gradient information.

According to another aspect, an embodiment of the present disclosure provides a joint training apparatus for models, including: an information determining module, configured to train a second-party model to be trained using a second sample quantity of second-party training samples to obtain second-party feature gradient information; and an information sending module, configured to send second sample quantity information and the second-party feature gradient information to a first party for instructing the first party to perform operations comprising: training a first-party model to be trained using a first sample quantity of first-party training samples to obtain first-party feature gradient information; and determining model joint gradient information according to the first-party feature gradient information, the second-party feature gradient information, first sample quantity information and the second sample quantity information, and updating the first-party model and the second-party model according to the model joint gradient information.

According to another aspect, an embodiment of the present disclosure provides an electronic device, including: at least one processor; and a memory communicatively connected with the at least one processor. The memory stores instructions executable by the at least one processor, and the instructions, when executed by the at least one processor, cause the at least one processor to execute the joint training method for models according to any embodiment of the disclosure.

According to another aspect, an embodiment of the present disclosure provides non-transitory computer-readable storage medium storing computer instructions. The computer instructions are used for a computer to execute the joint training method for models according to any embodiment of the disclosure.

It should be understood that the content described in this section is neither intended to identify key or important features of the embodiments of the present disclosure, nor intended to limit the scope of the present disclosure. Other features of the present disclosure will become understandable through the following description.

BRIEF DESCRIPTION OF THE DRAWINGS

The accompanying drawings are used to better understand the solution and do not constitute limitations to the present disclosure.

DETAILED DESCRIPTION OF EMBODIMENTS

Example embodiments of the present disclosure will be described below in combination with accompanying drawings, which include various details of embodiments of the present disclosure to facilitate understanding and should be regarded as merely example. Therefore, it should be appreciated by those of ordinary skill in the art that various changes and modifications can be made to the embodiments described here without departing from the scope and spirit of the present disclosure. Likewise, for clarity and conciseness, descriptions of well-known functions and structures are omitted in the following description.

Figure 1:
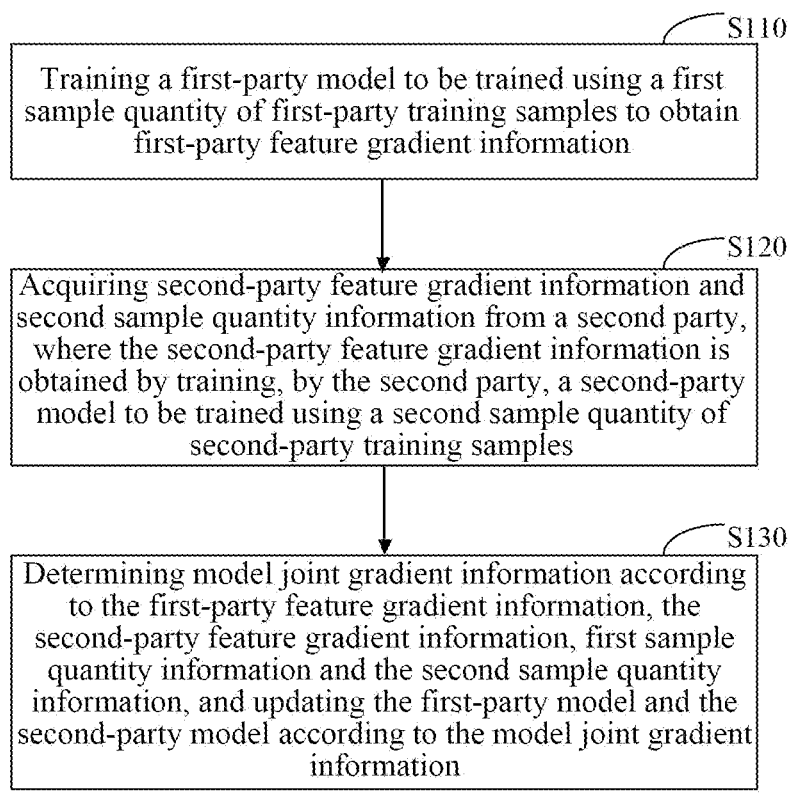
FIG. 1 is a schematic diagram of a joint training method for models according to an embodiment of the present disclosure.

FIG. 1 is a schematic diagram of a joint training method for models according to an embodiment of the present disclosure, and the embodiment of the present disclosure may be used to the cases of efficient joint training of models. The method may be executed by a joint training apparatus for models. The apparatus may be implemented by means of hardware and/or software, and may be configured in an electronic device. The method specifically includes the following steps.

S110: training a first-party model to be trained using a first sample quantity of first-party training samples to obtain first-party feature gradient information.

In the embodiment of the present disclosure, a first party and a second party may perform joint training. It should be noted that the embodiment of the present disclosure does not limit the number of participants in the joint training of models, for example, at least three parties may participate. The first sample quantity is a sample quantity of first-party training samples, which may be a quantity of samples randomly drawn or a quantity of all samples; the first-party model to be trained is a machine learning model trained by one participant in the joint training of models, such as a logistic regression model; and the first-party feature gradient information is a first gradient calculated by the first party of the joint training of models based on the first-party training samples.

Specifically, the first party may calculate a product of training parameters of the first-party model and the first sample quantity of first-party training samples; calculate a residual of the first-party training samples according to the product and a label vector; and obtain the first-party feature gradient information according to a product of the residual of the first-party training samples and the first-party training samples; where the label vector is constructed according to label values of the first-party training samples.

S120: acquiring second-party feature gradient information and second sample quantity information from a second party; where the second-party feature gradient information is obtained by training, by the second party, a second-party model to be trained using a second sample quantity of second-party training samples.

In the embodiment of the present disclosure, the second sample quantity information is feature information of the second sample quantity, which may be a second sample quantity plain text or a second sample quantity cipher text. The second sample quantity is a sample quantity of second-party training samples, which may be a quantity of samples randomly drawn or a quantity of all samples. In this embodiment, feature dimensions of the first party and the second party are the same, and each feature dimension of the first party and the second party corresponds to a gradient sum, so the numbers of gradient sums of the first party and the second party are the same. It should be noted that the embodiment of the present disclosure does not limit the network structures of the first-party model and the second-party model.

Specifically, the second party determining the second-party feature gradient information may include: calculating a product of training parameters of the second-party model and the second sample quantity of second-party training samples; calculating a residual of the second-party training samples according to the product and a label vector; and obtaining the second-party feature gradient information according to a product of the residual of the second-party training samples and the second-party training samples; where the label vector is constructed according to label values of the second-party training samples.

The training parameters of the second-party model and the training parameters of the first-party model may be the same, and the first-party model and the second-party model may be the same. Specifically, the first party may send the determined first-party model to be trained and training parameters to the second party for use as the second-party model to be trained and the training parameters of the second-party model in the second party.

S130: determining model joint gradient information according to the first-party feature gradient information, the second-party feature gradient information, first sample quantity information and the second sample quantity information, and updating the first-party model and the second-party model according to the model joint gradient information.

In the embodiment of the present disclosure, the model joint gradient information is obtained by joint calculation based on the gradients and sample quantity of the first party, and the gradients and sample quantity of the second party, so that the first party and the second party efficiently update the first-party model and the second-party model respectively according to the model joint gradient information.

Specifically, the model joint gradient information may be determined according to the first-party feature gradient information, the second-party feature gradient information, the first sample quantity information and the second sample quantity information according to the following formula.

$$\text{grad}_i = (\Sigma_{i=1}^n \text{grad}A_i + \Sigma_{i=1}^n \text{grad}B_i)/(\text{line\_}A + \text{line\_}B)$$

Where, $\text{grad}_i$ is the model joint gradient information; $\text{grad}A_i$ is the first-party feature gradient information; $\text{grad}B_i$ is the second-party feature gradient information; line_A is the first sample quantity information; line_B is the second sample quantity information; i is the first-party training sample; and n is the number of first samples.

During the process of updating the models of both parties, taking the updating of the first-party model as an example, after the first-party model is updated according to the model joint gradient information, the first-party needs to calculate an objective function of the updated first-party model and determine whether the objective function satisfies a convergence condition; if the objective function satisfies the convergence condition, the updated first-party model is a final model obtained by the first party after the joint training of models; if the objective function does not satisfy the convergence condition, iterative calculation is required to recalculate new first-party feature gradient information, and new second-party feature gradient information and new second sample quantity information are acquired from the second party; and new model joint gradient information is determined according to the new first-party feature gradient information, the new second-party feature gradient information, the new first sample quantity information and the new second sample quantity information, and the iteration is ended until the objective function determined according to the new model joint gradient information satisfies the convergence condition, thus obtaining the final model of the joint training of models.

In the technical solution of this embodiment, a first party trains a first-party model to be trained using a first sample quantity of first-party training samples to obtain first-party feature gradient information; second-party feature gradient information and second sample quantity information are acquired from a second party; and model joint gradient information is determined according to the first-party feature gradient information, the second-party feature gradient information, the first sample quantity information and the second sample quantity information, and the first-party model and the second-party model are updated according to the model joint gradient information. The embodiments of the present disclosure may determine, according to the gradients and sample quantities of training parties, the model joint gradient information suitable for updating the models of both parties, thereby greatly improving the efficiency of joint training of models.

Figure 2:
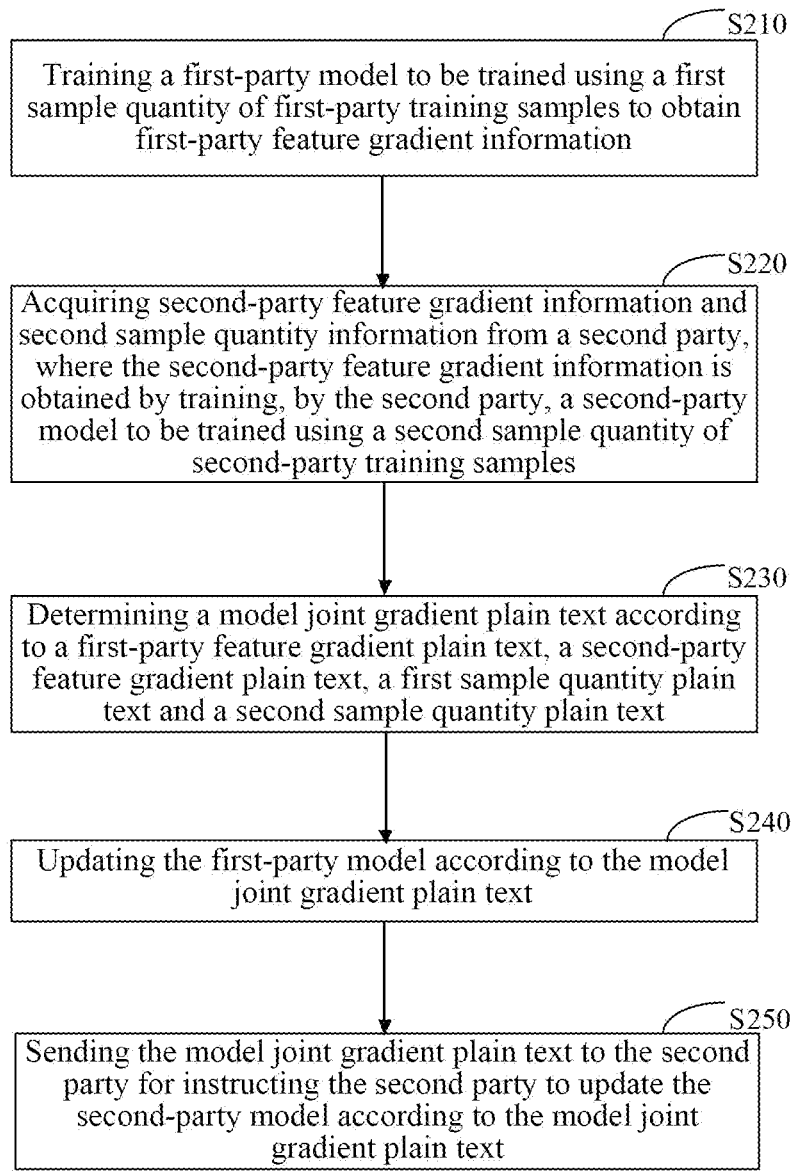
FIG. 2 is a schematic diagram of another joint training method for models according to an embodiment of the present disclosure.

The embodiment of the present disclosure further provides a preferred implementation of the joint training method for models, which can further improve the training efficiency of joint training of models. FIG. 2 is a schematic flowchart of another joint training method for models according to an embodiment of the present disclosure. The method specifically includes the following steps.

S210: training a first-party model to be trained using a first sample quantity of first-party training samples to obtain first-party feature gradient information.

S220: acquiring second-party feature gradient information and second sample quantity information from a second party; where the second-party feature gradient information is obtained by training, by the second party, a second-party model to be trained using a second sample quantity of second-party training samples.

S230: determining a model joint gradient plain text according to a first-party feature gradient plain text, a second-party feature gradient plain text, a first sample quantity plain text and a second sample quantity plain text.

In the embodiment of the present disclosure, the first-party feature gradient plain text is first-party feature gradient information that is calculated by the first party and has not been encrypted; the second-party feature gradient plain text is second-party feature gradient information that is calculated by the second party and has not been encrypted; the first sample quantity plain text is first sample quantity information of first-party training data, for example, first sample quantity line_A; and the second sample quantity plain text is second sample quantity information of second-party training data, for example, second sample quantity line_B. This embodiment calculates the model joint gradient plain text according to the unencrypted gradients and sample quantity of the first party and the unencrypted gradients and sample quantity of the second party, which can further improve the training efficiency of joint training of models, thereby quickly and effectively determining the first-party model and the second-party model.

S240: updating the first-party model according to the model joint gradient plain text.

In the embodiment of the present disclosure, after the first party calculates the model joint gradient plain text for updating models, during the process of updating the first-party model, whether the model joint gradient plain text is available needs to be first verified; specifically, the first-party model is updated according to the model joint gradient plain text, and an objective function of the first-party model is calculated; whether the objective function satisfies a convergence condition is determined, that is, whether the updated first-party model is qualified is determined; if the objective function satisfies the convergence condition, the first-party model is determined to be a final model of the joint training of models; and if the objective function does not satisfy the convergence condition, iterative calculation is required until the objective function satisfies the convergence condition.

S250: sending the model joint gradient plain text to the second party for instructing the second party to update the second-party model according to the model joint gradient plain text.

In the embodiment of the present disclosure, after the first party calculates the model joint gradient plain text, in order to ensure that the second party can timely and accurately update the second-party model, the first party needs to send the model joint gradient plain text to the second party, so that the second party can update the second-party model according to the model joint gradient plain text.

On the basis of the above-mentioned embodiment, optionally, the first-party training samples are randomly drawn by the first party from first-party sample data, and the quantity of samples randomly drawn is used as the first sample quantity; the second-party training samples are randomly drawn by the second party from second-party sample data, and the quantity of samples randomly drawn is used as the second sample quantity.

In the embodiment of the present disclosure, the first-party training samples and the second-party training samples are randomly drawn, indicating that the first sample quantity and the second sample quantity are random numbers and cannot be easily calculated; and when the model joint gradient plain text is calculated by randomly selecting some of the training samples, the calculation party (such as the first party) cannot know the specific sample quantity of the participant (such as the second party), and also cannot infer the original data information of the participant, thereby effectively solving the problem of data leakage of the participant during the training process, and greatly protecting the security of data of the participant.

On the basis of the above-mentioned embodiment, optionally, the data structures of the first-party training samples and the second-party training samples are the same.

In the embodiment of the present disclosure, exemplarily, the first party and the second party have sample data Qa and Qb sets, the dimensions of the two samples are the same, both are D, and the sample quantities are respectively Sa and Sb; the data of both parties are horizontally fused by rows to expand the sample quantity of data to the greatest extent, and the sample quantity after expansion is Sa+Sb. The data in the same dimension has the same dimension feature, but does not cause a large degree of data error in the joint training of models process. This embodiment effectively expands the sample quantity of joint training of models by selecting fusion data of the first party and the second party in the horizontal dimension.

On the basis of the above-mentioned embodiment, optionally, the method of this embodiment further includes: determining common feature dimensions between the first-party sample data and the second-party sample data through a security intersection protocol; and determining the first-party training samples and the second-party training samples based on the common feature dimensions.

In the embodiment of the present disclosure, the data sets of the first party and the second party are relatively large and may have many dimensions, so the dimensions are named by unified dimension naming means, and a set of same dimensions of both parties is obtained by means of the security intersection protocol. The both parties finally obtain intersected dimension information, but not other dimension information. The security intersection protocol is a transport protocol pre-established by both parties for determining common dimensions, and the protocol can ensure the security and privacy during the process of determining dimensions; for example, the security intersection protocol may be a privacy set intersection protocol implemented based on Oblivious Transfer (OT), and this protocol allows participants to perform an intersection operation on secret sets without revealing information other than the intersection. In this embodiment, the training samples in the common dimensions of the both parties can be securely and accurately identified according to the security intersection protocol.

Figure 3:
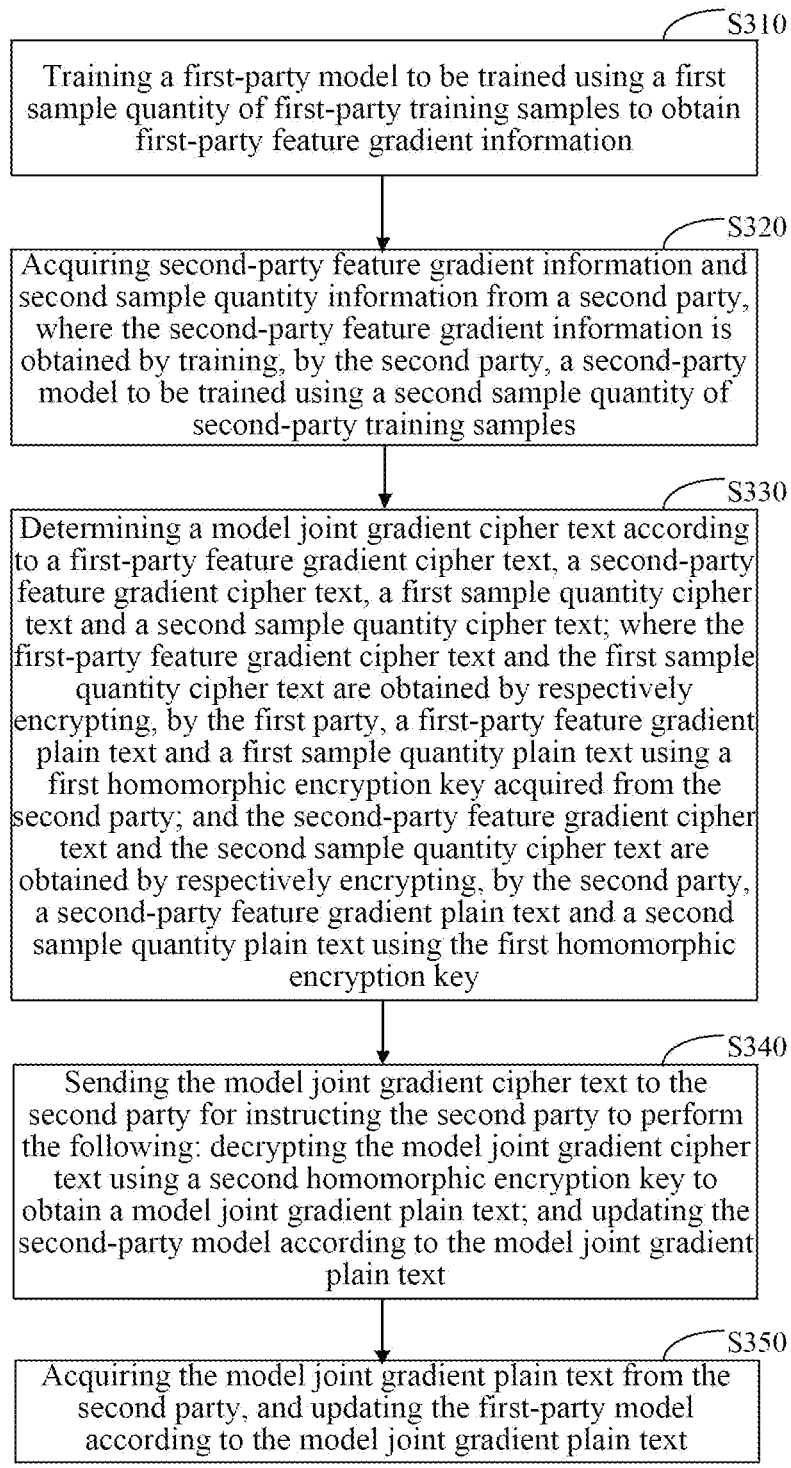
FIG. 3 is a schematic diagram of yet another joint training method for models according to an embodiment of the present disclosure.

The embodiment of the present disclosure further provides a preferred implementation of the joint training method for models, which can securely and effectively determine the model joint gradient information. FIG. 3 is a schematic flowchart of yet another joint training method for models according to an embodiment of the present disclosure. The method specifically includes the following steps.

S310: training a first-party model to be trained using a first sample quantity of first-party training samples to obtain first-party feature gradient information.

S320: acquiring second-party feature gradient information and second sample quantity information from a second party, where the second-party feature gradient information is obtained by training, by the second party, a second-party model to be trained using a second sample quantity of second-party training samples.

S330: determining a model joint gradient cipher text according to a first-party feature gradient cipher text, a second-party feature gradient cipher text, a first sample quantity cipher text and a second sample quantity cipher text. The first-party feature gradient cipher text and the first sample quantity cipher text are obtained by respectively encrypting, by the first party, a first-party feature gradient plain text and a first sample quantity plain text using a first homomorphic encryption key acquired from the second party; and the second-party feature gradient cipher text and the second sample quantity cipher text are obtained by respectively encrypting, by the second party, a second-party feature gradient plain text and a second sample quantity plain text using the first homomorphic encryption key.

In the embodiment of the present disclosure, in order to ensure the security of data during the transmission process, when the second party transmits gradients and sample quantity data to the first party, the transmitted data needs to be encrypted, which prevents the data from being tampered to cause security risks during the transmission process. The first homomorphic encryption key used for encryption by the second party is generated by the second party, and the second party also generates a second homomorphic encryption key, that is, a decryption key corresponding to the first homomorphic encryption key. Specifically, in this embodiment, the first party may send the first-party model and model parameters to the second party for use as the second-party model and model parameters of the second party. Correspondingly, the second party may generate, according to a timestamp that the first party sends the first-party model and model parameters, asymmetric keys, that is, the first homomorphic encryption key and the second homomorphic encryption key; and send the first homomorphic encryption key to the first party, so that the first party encrypts the processed data to effectively ensure the security of data transmission.

S340: sending the model joint gradient cipher text to the second party for instructing the second party to perform the following: decrypting the model joint gradient cipher text using a second homomorphic encryption key to obtain a model joint gradient plain text; and updating the second-party model according to the model joint gradient plain text.

In the embodiment of the present disclosure, when the first party calculates the model joint gradient cipher text, because the model joint gradient cipher text contains encrypted data of the second party, the model joint gradient cipher text needs to be sent to the second party for decryption. In this embodiment, the first party calculates the model joint gradient cipher text according to the gradients and sample quantity encrypted by the second party, and the gradients and sample quantity of the first party. During the calculation process, the first party does not know participating data of the gradients and sample quantity of the second party, so that the second-party data may be fully used without being stolen.

S350: acquiring the model joint gradient plain text from the second party, and updating the first-party model according to the model joint gradient plain text.

In the embodiment of the present disclosure, the model joint gradient plain text acquired by the first party from the second party is unencrypted data, and the first party may directly update the first-party model according to the model joint gradient plain text; and during the updating process, an objective function of the first-party model needs to be referred, and whether the objective function satisfies a convergence condition is determined to determine whether the first-party model is updated.

In the embodiment of the present disclosure, only the both parties participating in the joint training of models calculate the model joint gradient information and update the models of the both parties respectively. During this period, a third party is not introduced to calculate the model joint gradient information, thereby effectively improving the training efficiency of models. The data structures provided by the both parties in this embodiment are similar, and belong to joint modeling based on different user quantities in the same industry.

Figure 4:
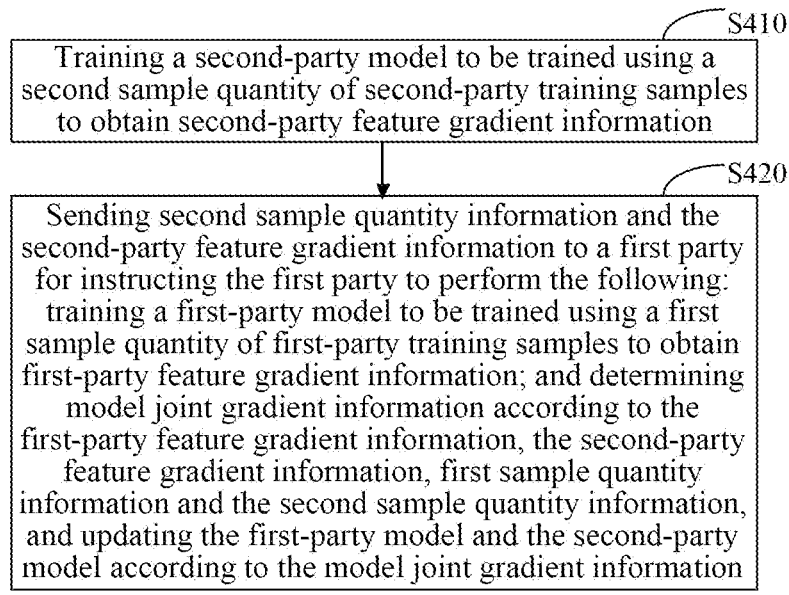
FIG. 4 is a schematic diagram of yet another joint training method for models according to an embodiment of the present disclosure.

FIG. 4 is a schematic diagram of yet another joint training method for models according to an embodiment of the present disclosure. The embodiment of the present disclosure is applicable to the cases in which model training data is sent to a model demander to implement joint training of models. The method may be executed by a joint training apparatus for models. The apparatus may be implemented by means of hardware and/or software, and may be configured in an electronic device. The method specifically includes the following steps.

S410: training a second-party model to be trained using a second sample quantity of second-party training samples to obtain second-party feature gradient information.

In the embodiment of the present disclosure, the second sample quantity is a sample quantity of second-party training samples, which may be a quantity of samples randomly drawn or a quantity of all samples; the second-party model to be trained is a local model used for training by a second party that participates in joint training of models, or a logistic regression model in a machine learning model; and the second-party feature gradient information is a gradient calculated by the second party.

Specifically, when the second party determines the second-party feature gradient information, the method may include: calculating a product of training parameters of the second-party model and the second sample quantity of second-party training samples, where the training parameters of the second-party model may be training parameters, acquired from a first party, of a first-party model; calculating a residual of the second-party training samples according to the product and a label vector, where the label vector is constructed according to label values of the second-party training samples; and obtaining the second-party feature gradient information according to a product of the residual of the second-party training samples and the second-party training samples.

S420: sending second sample quantity information and the second-party feature gradient information to a first party for instructing the first party to perform the following: training a first-party model to be trained using a first sample quantity of first-party training samples to obtain first-party feature gradient information; and determining model joint gradient information according to the first-party feature gradient information, the second-party feature gradient information, first sample quantity information and the second sample quantity information, and updating the first-party model and the second-party model according to the model joint gradient information.

In this embodiment, when the first party calculates the model joint gradient information, the gradients and sample quantity of the second party are required. Then, the second party needs to send, to the first party, the gradients and sample quantity for calculating the model joint gradient information, thereby effectively implementing the determination of the model joint gradient information.

In the technical solution of this embodiment, a second party trains a second-party model to be trained using a second sample quantity of second-party training samples to obtain second-party feature gradient information; and sends second sample quantity information and the second-party features gradient information to a first party, so that the first party determines model joint gradient information. In the embodiment of the present disclosure, the second party sends the gradients and sample quantity to the first party, so that the first party may effectively calculate the model joint gradient information in combination with the gradients and sample quantity of the second party, thereby realizing effective update of the models of both parties.

On the basis of the above-mentioned embodiment, optionally, the first-party training samples are randomly drawn by the first party from first-party sample data, and the quantity of samples randomly drawn is used as the first sample quantity; the second-party training samples are randomly drawn by the second party from second-party sample data, and the quantity of samples randomly drawn is used as the second sample quantity.

In the embodiment of the present disclosure, the first-party training samples and the second-party training samples are randomly drawn, indicating that the first sample quantity and the second sample quantity are random numbers and cannot be easily calculated; and when the model joint gradient plain text is calculated by randomly selecting some of the training samples, the calculation party (such as the first party) cannot know the specific sample quantity of the participant (such as the second party), and also cannot infer the original data information of the participant, thereby effectively solving the problem of data leakage of the participant during the training process, and greatly protecting the security of data of the participant.

On the basis of the above-mentioned embodiment, optionally, sending the second sample quantity information and the second-party feature gradient information to the first party includes: 1) sending a second sample quantity plain text and a second-party feature gradient plain text to the first party for instructing the first party to perform operations comprising: determining a model joint gradient plain text according to a first-party feature gradient plain text, the second-party feature gradient plain text, a first sample quantity plain text and the second sample quantity plain text; and updating the first-party model according to the model joint gradient plain text; and 2) acquiring the model joint gradient plain text from the first party, and updating the second-party model according to the model joint gradient plain text.

In the embodiment of the present disclosure, the second party directly sends the unencrypted second-party feature gradient information (the second-party feature gradient plain text) and unencrypted second sample quantity information (the second sample quantity plain text) to the first party; where the second sample quantity plain text is second sample quantity information of second-party training data in the second party, for example, the number of rows of the second-party training data. In this embodiment, the second party directly sends the unencrypted gradients and sample quantity to the first party, which may effectively improve the transmission efficiency of data; meanwhile, because the second sample quantity plain text of the second party is obtained by random drawing, the first party cannot infer any information of the second party when calculating the model joint gradient information, which effectively ensures the information security of the second party.

On the basis of the above-mentioned embodiment, optionally, the method of this embodiment further includes: determining a first homomorphic encryption key and a second homomorphic encryption key, and sending the first homomorphic encryption key to the first party.

Sending the second sample quantity information and the second-party feature gradient information to the first party includes: 1) sending a second sample quantity cipher text and a second-party feature gradient cipher text to the first party for instructing the first party to perform operations comprising: determining a model joint gradient cipher text according to a first-party feature gradient cipher text, the second-party feature gradient cipher text, a first sample quantity cipher text and the second sample quantity cipher text; where the first-party feature gradient cipher text and the first sample quantity cipher text are obtained by respectively encrypting, by the first party, the first-party feature gradient plain text and the first sample quantity plain text using the first homomorphic encryption key; and the second-party feature gradient cipher text and the second sample quantity cipher text are obtained by respectively encrypting, by the second party, the second-party feature gradient plain text and the second sample quantity plain text using the first homomorphic encryption key; 2) acquiring the model joint gradient cipher text from the first party, decrypting the model joint gradient cipher text using the second homomorphic encryption key to obtain the model joint gradient plain text, and updating the second-party model according to the model joint gradient plain text; and 3) sending the model joint gradient plain text to the first party for instructing the first party to update the first-party model according to the model joint gradient plain text.

In the embodiment of the present disclosure, data is encrypted by means of asymmetric encryption, and the keys include an encryption key (the first homomorphic encryption key) and a decryption key (the second homomorphic encryption key); the keys are generated by the second party. In this embodiment, the first party cannot obtain the second homomorphic encryption key, therefore, this embodiment can effectively ensure data integrity during data processing by means of the asymmetric encryption.

Before the second party sends the gradients and sample quantity to the first party, the gradients and sample quantity need to be encrypted using the first homomorphic encryption key to obtain a gradient cipher text and a sample quantity cipher text, which are then sent, which can prevent the problem of random tampering of data; after the first party calculates the model joint gradient information, the model joint gradient information needs to be encrypted using the first homomorphic encryption key to obtain a model joint gradient cipher text, which is then sent to the second party, so that the second party decrypts the model joint gradient cipher text to obtain a model joint gradient plain text for updating the models of both parties. In this way, during the process of calculating the model joint gradient plain text, the calculation process will be not modified by any party; and under the premise of ensuring the security of data of the participant, the data of the participant is fully used to realize joint training of models.

On the basis of the above-mentioned embodiment, optionally, the data structures of the first-party training samples and the second-party training samples are the same.

In the embodiment of the present disclosure, exemplarily, the first party and the second party have sample data Qa and Qb sets, the dimensions of the two samples are the same, both are D, and the sample quantities are respectively Sa and Sb; the data of both parties are horizontally fused by rows to expand the sample quantity of data to the greatest extent, and the sample quantity after expansion is Sa+Sb. The data in the same dimension has the same dimension feature, but does not cause a large degree of data error in the joint training of models process. This embodiment effectively expands the sample quantity of joint training of models by selecting fusion data of the first party and the second party in the horizontal dimension.

The technology according to embodiments of the present disclosure improves the security of jointly training the models.

Figure 5:
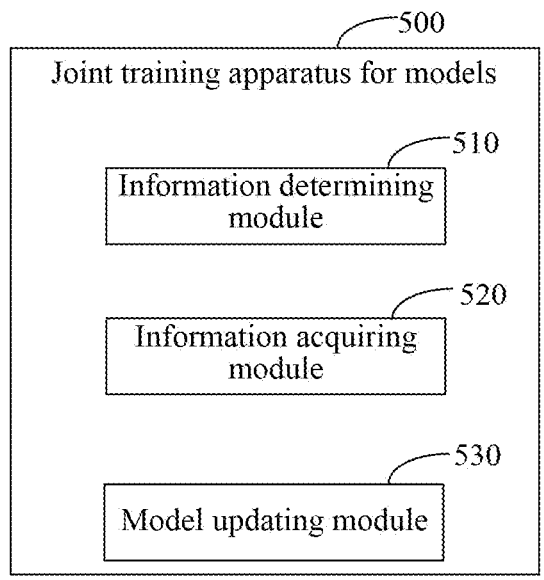
FIG. 5 is a schematic diagram of a joint training apparatus for models according to an embodiment of the present disclosure.

FIG. 5 is a schematic diagram of a joint training apparatus for models according to an embodiment of the present disclosure. This embodiment is applicable to the case of efficient joint training of models. The apparatus is configured in an electronic device, and may implement the joint training method for models according to any embodiment of the present disclosure. The joint training apparatus 500 for models specifically includes: an information determining module 510, configured to train a first-party model to be trained using a first sample quantity of first-party training samples to obtain first-party feature gradient information; an information acquiring module 520, configured to acquire second-party feature gradient information and second sample quantity information from a second party, where the second-party feature gradient information is obtained by training, by the second party, a second-party model to be trained using a second sample quantity of second-party training samples; and a model updating module 530, configured to determine model joint gradient information according to the first-party feature gradient information, the second-party feature gradient information, first sample quantity information and the second sample quantity information, and update the first-party model and the second-party model according to the model joint gradient information.

On the basis of the above-mentioned embodiment, optionally, the first-party training samples are randomly drawn by the first party from first-party sample data, and the quantity of samples randomly drawn from the first-party sample data is used as the first sample quantity; the second-party training samples are randomly drawn by the second party from second-party sample data, and the quantity of samples randomly drawn from the second-party sample data is used as the second sample quantity.

On the basis of the above-mentioned embodiment, optionally, the model updating module 530 is specifically configured to: determine a model joint gradient plain text according to a first-party feature gradient plain text, a second-party feature gradient plain text, a first sample quantity plain text and a second sample quantity plain text; update the first-party model according to the model joint gradient plain text; and send the model joint gradient plain text to the second party for instructing the second party to update the second-party model according to the model joint gradient plain text.

On the basis of the above-mentioned embodiment, optionally, the model updating module 530 is further specifically configured to: 1) determine a model joint gradient cipher text according to a first-party feature gradient cipher text, a second-party feature gradient cipher text, a first sample quantity cipher text and a second sample quantity cipher text; where the first-party feature gradient cipher text and the first sample quantity cipher text are obtained by respectively encrypting, by the first party, the first-party feature gradient plain text and the first sample quantity plain text using a first homomorphic encryption key acquired from the second party; and where the second-party feature gradient cipher text and the second sample quantity cipher text are obtained by respectively encrypting, by the second party, the second-party feature gradient plain text and the second sample quantity plain text using the first homomorphic encryption key; 2) send the model joint gradient cipher text to the second party for instructing the second party to perform operations comprising: decrypting the model joint gradient cipher text using a second homomorphic encryption key to obtain the model joint gradient plain text; and updating the second-party model according to the model joint gradient plain text; and 3) acquire the model joint gradient plain text from the second party, and update the first-party model according to the model joint gradient plain text.

On the basis of the above-mentioned embodiment, optionally, the data structures of the first-party training samples and the second-party training samples are the same.

Based on the above-mentioned embodiment, optionally, the apparatus in this embodiment further includes: a dimension determining module, configured to determine common feature dimensions between the first-party sample data and the second-party sample data through a security intersection protocol; and a training sample determining module, configured to determine the first-party training samples and the second-party training samples based on the common feature dimensions.

The technical solution of this embodiment may determine, according to the gradients and sample quantities of training parties, the model joint gradient information suitable for updating the models of both parties, thereby greatly improving the efficiency of joint training of models.

Figure 6:
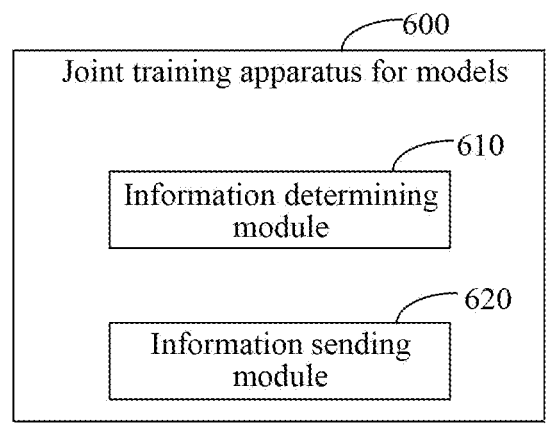
FIG. 6 is a schematic diagram of another joint training apparatus for models according to an embodiment of the present disclosure.

FIG. 6 is a schematic diagram of another joint training apparatus for models according to an embodiment of the present disclosure. This embodiment is applicable to the cases in which model training data is sent to a model demander to implement joint training of models. The apparatus is configured in an electronic device, and may implement the joint training method for models according to any embodiment of the present disclosure. The joint training apparatus for models 600 specifically includes: an information determining module 610, configured to train a second-party model to be trained using a second sample quantity of second-party training samples to obtain second-party feature gradient information; and an information sending module 620, configured to send second sample quantity information and the second-party feature gradient information to a first party for instructing the first party to perform operations comprising: training a first-party model to be trained using a first sample quantity of first-party training samples to obtain first-party feature gradient information; and determining model joint gradient information according to the first-party feature gradient information, the second-party feature gradient information, first sample quantity information and the second sample quantity information, and updating the first-party model and the second-party model according to the model joint gradient information.

On the basis of the above-mentioned embodiment, optionally, the first-party training samples are randomly drawn by the first party from first-party sample data, and the quantity of samples randomly drawn from the first-party sample data is used as the first sample quantity; the second-party training samples are randomly drawn by the second party from second-party sample data, and the quantity of samples randomly drawn from the second-party sample data is used as the second sample quantity.

On the basis of the above-mentioned embodiment, optionally, the information sending module 620 is specifically configured to: 1) send a second sample quantity plain text and a second-party feature gradient plain text to the first party for instructing the first party to perform operations comprising: determining a model joint gradient plain text according to a first-party feature gradient plain text, the second-party feature gradient plain text, a first sample quantity plain text and the second sample quantity plain text; and updating the first-party model according to the model joint gradient plain text; and 2) acquire the model joint gradient plain text from the first party, and update the second-party model according to the model joint gradient plain text.

Based on the above-mentioned embodiment, optionally, the apparatus in this embodiment further includes: an encryption key determining module, configured to determine a first homomorphic encryption key and a second homomorphic encryption key, and send the first homomorphic encryption key to the first party;

The information sending module 620 is further specifically configured to: 1) send a second sample quantity cipher text and a second-party feature gradient cipher text to the first party for instructing the first party to perform operations comprising: determining a model joint gradient cipher text according to a first-party feature gradient cipher text, the second-party feature gradient cipher text, a first sample quantity cipher text and the second sample quantity cipher text; where the first-party feature gradient cipher text and the first sample quantity cipher text are obtained by respectively encrypting, by the first party, the first-party feature gradient plain text and the first sample quantity plain text using the first homomorphic encryption key; and where the second-party feature gradient cipher text and the second sample quantity cipher text are obtained by respectively encrypting, by the second party, the second-party feature gradient plain text and the second sample quantity plain text using the first homomorphic encryption key; and 2) acquire the model joint gradient cipher text from the first party, decrypt the model joint gradient cipher text using the second homomorphic encryption key to obtain the model joint gradient plain text, and update the second-party model according to the model joint gradient plain text; and 3) send the model joint gradient plain text to the first party for instructing the first party to update the first-party model according to the model joint gradient plain text.

On the basis of the above-mentioned embodiment, optionally, the data structures of the first-party training samples and the second-party training samples are the same.

In the technical solution of this embodiment, the second party sends the gradients and sample quantity to the first party, so that the first party may effectively calculate the model joint gradient information in combination with the gradients and sample quantity of the second party, thereby realizing effective update of the models of both parties.

According to an embodiment of the present disclosure, the present disclosure further provides an electronic device and a readable storage medium.

Figure 7:
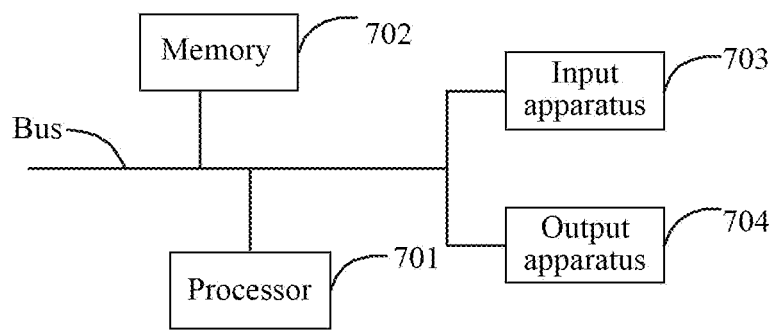
FIG. 7 is a block diagram of an electronic device used to implement the joint training method for models according to embodiments of the present disclosure.

As shown in FIG. 7, which is a block diagram of an electronic device of joint training method for models according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 701 is used as an example.

The memory 702 is a non-transitory computer readable storage medium provided by the present disclosure. The memory stores instructions executable by at least one processor, so that the at least one processor performs the joint training method for models provided by the present disclosure. The non-transitory computer readable storage medium of the present disclosure stores computer instructions for causing a computer to perform the joint training method for models provided by the present disclosure.

The memory 702, as a non-transitory computer readable storage medium, may be used to store non-transitory software programs, non-transitory computer executable programs and modules, such as program instructions/modules corresponding to the joint training method for models in the embodiments of the present disclosure. The processor 701 executes the non-transitory software programs, instructions, and modules stored in the memory 602 to execute various functional applications and data processing of the server, that is, to implement the joint training method for models in the foregoing method embodiment.

The memory 702 may include a storage program area and a storage data area, where the storage program area may store an operating system and at least one function required application program; and the storage data area may store data created by the use of the electronic device according to the method for processing parking, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for processing parking through a network. Examples of the above network include but are not limited to the Internet, intranet, local area network, mobile communication network, and combinations thereof.

The electronic device of the joint training method for models may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device of the joint training method for models, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

The technical solution according to the embodiments of the present disclosure may determine, according to the gradients and sample quantities of training parties, the model joint gradient information suitable for updating the models of both parties, thereby greatly improving the efficiency of joint training of models.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A joint training method for models, comprising:
    training a first-party model to be trained using a first sample quantity of first-party training samples to obtain first-party feature gradient information;
    acquiring second-party feature gradient information and second sample quantity information from a second party, wherein the second-party feature gradient information is obtained by training, by the second party, a second-party model to be trained using a second sample quantity of second-party training samples;
    determining a model joint gradient cipher text according to a first-party feature gradient cipher text, a second-party feature gradient cipher text, a first sample quantity cipher text and a second sample quantity cipher text; wherein the first-party feature gradient cipher text and the first sample quantity cipher text are obtained by respectively encrypting, by the first party, the first-party feature gradient plain text and the first sample quantity plain text using a first homomorphic encryption key acquired from the second party;
    wherein the second-party feature gradient cipher text and the second sample quantity cipher text are obtained by respectively encrypting, by the second party, the second-party feature gradient plain text and the second sample quantity plain text using the first homomorphic encryption key, and wherein the first sample quantity is a sample quantity of the first-party training samples, and the second sample quantity is a sample quantity of the second-party training samples; and
    updating the first-party model and the second-party model according to the model joint gradient information.

2. The method according to claim 1, wherein the first-party training samples are randomly drawn by the first party from first-party sample data, and a quantity of samples randomly drawn from the first-party sample data is used as the first sample quantity; the second-party training samples are randomly drawn by the second party from second-party sample data, and a quantity of samples randomly drawn from the second-party sample data is used as the second sample quantity.

3. The method according to claim 1, wherein the updating the first-party model and the second-party model according to the model joint gradient information comprises:
    sending the model joint gradient cipher text to the second party for instructing the second party to perform operations comprising: decrypting the model joint gradient cipher text using a second homomorphic encryption key to obtain the model joint gradient plain text; and updating the second-party model according to the model joint gradient plain text; and
    acquiring the model joint gradient plain text from the second party, and updating the first-party model according to the model joint gradient plain text.

4. The method according to claim 1, wherein data structures of the first-party training samples and the second-party training samples are same.

5. The method according to claim 4, further comprising:
    determining common feature dimensions between the first-party sample data and the second-party sample data through a security intersection protocol; and
    determining the first-party training samples and the second-party training samples based on the common feature dimensions.

6. A non-transitory computer-readable storage medium storing computer instructions, wherein the computer instructions are used for a computer to execute the method according to claim 1.

7. A joint training method for models, comprising:
    training a second-party model to be trained using a second sample quantity of second-party training samples to obtain second-party feature gradient information; and
    sending second sample quantity information and the second-party feature gradient information to a first party for instructing the first party to perform operations comprising:
    training a first-party model to be trained using a first sample quantity of first-party training samples to obtain first-party feature gradient information; and determining model joint gradient information according to the first-party feature gradient information, the second-party feature gradient information, first sample quantity information and the second sample quantity information, and updating the first-party model and the second-party model according to the model joint gradient information;
    wherein the method further comprises: determining a first homomorphic encryption key and a second homomorphic encryption key, and sending the first homomorphic encryption key to the first party; wherein the sending second sample quantity information and the second-party feature gradient information to the first party comprises:
    sending a second sample quantity cipher text and a second-party feature gradient cipher text to the first party for instructing the first party to perform operations comprising:
    determining a model joint gradient cipher text according to a first-party feature gradient cipher text, the second-party feature gradient cipher text, a first sample quantity cipher text and the second sample quantity cipher text; wherein the first-party feature gradient cipher text and the first sample quantity cipher text are obtained by respectively encrypting, by the first party, the first-party feature gradient plain text and the first sample quantity plain text using the first homomorphic encryption key; wherein the second-party feature gradient cipher text and the second sample quantity cipher text are obtained by respectively encrypting, by the second party, the second-party feature gradient plain text and the second sample quantity plain text using the first homomorphic encryption key, and wherein the first sample quantity is a sample quantity of the first-party training samples, and the second sample quantity is a sample quantity of the second-party training samples.

8. The method according to claim 7, wherein the first-party training samples are randomly drawn by the first party from first-party sample data, and a quantity of samples randomly drawn from the first-party sample data is used as the first sample quantity; the second-party training samples are randomly drawn by the second party from second-party sample data, and a quantity of samples randomly drawn from the second-party sample data is used as the second sample quantity.

9. The method according to claim 7, wherein the updating the first-party model and the second-party model according to the model joint gradient information comprises:
acquiring the model joint gradient cipher text from the first party, decrypting the model joint gradient cipher text using the second homomorphic encryption key to obtain the model joint gradient plain text, and updating the second-party model according to the model joint gradient plain text; and
sending the model joint gradient plain text to the first party for instructing the first party to update the first-party model according to the model joint gradient plain text.

10. The method according to claim 7, wherein data structures of the first-party training samples and the second-party training samples are same.

11. A non-transitory computer-readable storage medium storing computer instructions, wherein the computer instructions are used for a computer to execute the method according to claim 7.

12. An electronic device, comprising:
at least one processor; and
a memory communicatively connected with the at least one processor;
wherein the memory stores instructions executable by the at least one processor, and the instructions, when executed by the at least one processor, cause the at least one processor to perform operations, comprising:
training a first-party model to be trained using a first sample quantity of first-party training samples to obtain first-party feature gradient information;
acquiring second-party feature gradient information and second sample quantity information from a second party, wherein the second-party feature gradient information is obtained by training, by the second party, a second-party model to be trained using a second sample quantity of second-party training samples;
determining a model joint gradient cipher text according to a first-party feature gradient cipher text, a second-party feature gradient cipher text, a first sample quantity cipher text and a second sample quantity cipher text; wherein the first-party feature gradient cipher text and the first sample quantity cipher text are obtained by respectively encrypting, by the first party, the first-party feature gradient plain text and the first sample quantity plain text using a first homomorphic encryption key acquired from the second party;
wherein the second-party feature gradient cipher text and the second sample quantity cipher text are obtained by respectively encrypting, by the second party, the second-party feature gradient plain text and the second sample quantity plain text using the first homomorphic encryption key, and wherein the first sample quantity is a sample quantity of the first-party training samples, and the second sample quantity is a sample quantity of the second-party training samples; and
updating the first-party model and the second-party model according to the model joint gradient information.

13. The electronic device according to claim 12, wherein the first-party training samples are randomly drawn by the first party from first-party sample data, and a quantity of samples randomly drawn from the first-party sample data is used as the first sample quantity; the second-party training samples are randomly drawn by the second party from second-party sample data, and a quantity of samples randomly drawn from the second-party sample data is used as the second sample quantity.

14. The electronic device according to claim 12, wherein the updating the first-party model and the second-party model according to the model joint gradient information comprises:
sending the model joint gradient cipher text to the second party for instructing the second party to perform operations comprising: decrypting the model joint gradient cipher text using a second homomorphic encryption key to obtain the model joint gradient plain text; and updating the second-party model according to the model joint gradient plain text; and
acquiring the model joint gradient plain text from the second party, and updating the first-party model according to the model joint gradient plain text.

15. An electronic device, comprising:
at least one processor; and
a memory communicatively connected with the at least one processor;
wherein the memory stores instructions executable by the at least one processor, and the instructions, when executed by the at least one processor, cause the at least one processor to perform operations, comprising:
training a second-party model to be trained using a second sample quantity of second-party training samples to obtain second-party feature gradient information; and
sending second sample quantity information and the second-party feature gradient information to a first party for instructing the first party to perform operations comprising:
training a first-party model to be trained using a first sample quantity of first-party training samples to obtain first-party feature gradient information; and determining model joint gradient information according to the first-party feature gradient information, the second-party feature gradient information, first sample quantity information and the second sample quantity information, and updating the first-party model and the second-party model according to the model joint gradient information;
wherein the operations further comprise: determining a first homomorphic encryption key and a second homomorphic encryption key, and sending the first homomorphic encryption key to the first party; wherein the sending second sample quantity information and the second-party feature gradient information to the first party comprises:
sending a second sample quantity cipher text and a second-party feature gradient cipher text to the first party for instructing the first party to perform operations comprising: determining a model joint gradient cipher text according to a first-party feature gradient cipher text, the second-party feature gradient cipher text, a first sample quantity cipher text and the second sample quantity cipher text; wherein the first-party feature gradient cipher text and the first sample quantity cipher text are obtained by respectively encrypting, by the first party, the first-party feature gradient plain text and the first sample quantity plain text using the first homomorphic encryption key; wherein the second-party feature gradient cipher text and the second sample quantity cipher text are obtained by respectively encrypting, by the second party, the second-party feature gradient plain text and the second sample quantity plain text using the first homomorphic encryption key, and wherein the first sample quantity is a sample quantity of the first-party training samples, and the second sample quantity is a sample quantity of the second-party training samples.

16. The electronic device according to claim 15, wherein the first-party training samples are randomly drawn by the first party from first-party sample data, and a quantity of samples randomly drawn from the first-party sample data is used as the first sample quantity; the second-party training samples are randomly drawn by the second party from second-party sample data, and a quantity of samples randomly drawn from the second-party sample data is used as the second sample quantity.

* * * * *